(12) United States Patent
Imahase (10) Patent No.: US 11,135,646 B2
(45) Date of Patent: Oct. 5, 2021

(54) PLATE, AND HOLDING APPARATUS AND HOLDING METHOD FOR THE PLATE

(71) Applicant: KROSAKIHARIMA CORPORATION, Fukuoka (JP)

(72) Inventor: Toshihiro Imahase, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 247 days.

(21) Appl. No.: 16/342,701

(22) PCT Filed: Oct. 16, 2017

(86) PCT No.: PCT/JP2017/037395
§ 371 (c)(1),
(2) Date: Apr. 17, 2019

(87) PCT Pub. No.: WO2018/074424
PCT Pub. Date: Apr. 26, 2018

(65) Prior Publication Data
US 2020/0038944 A1 Feb. 6, 2020

(30) Foreign Application Priority Data
Oct. 20, 2016 (JP) .............................. JP2016-206123

(51) Int. Cl.
*B22D 11/10* (2006.01)
*B22D 11/18* (2006.01)
(Continued)

(52) U.S. Cl.
CPC .............. *B22D 11/10* (2013.01); *B22D 11/18* (2013.01); *B22D 41/34* (2013.01); *B22D 41/38* (2013.01); *B22D 41/40* (2013.01); *B22D 41/56* (2013.01)

(58) Field of Classification Search
CPC ........ B22D 11/10; B22D 11/18; B22D 41/28; B22D 41/34; B22D 41/38; B22D 41/40; B22D 41/56
(Continued)

(56) References Cited

U.S. PATENT DOCUMENTS 3,850,351 A * 11/1974 Yoshihara .............. B22D 41/26
222/598
5,645,793 A * 7/1997 Yamamoto ............. B22D 41/22
266/287
(Continued)

FOREIGN PATENT DOCUMENTS

JP 53-53526 A 5/1978
JP 2-280959 A 11/1990
(Continued)

OTHER PUBLICATIONS

International Search Report (English translation) for PCT/JP2017/037395 filed, Oct. 16, 2017.
(Continued)

*Primary Examiner* — Scott R Kastler
*Assistant Examiner* — Michael Aboagye
(74) *Attorney, Agent, or Firm* — Paul D. Bianco; Gary S. Winer; Fleit Intellectual Property Law (57) ABSTRACT

A plate, a plate-holding apparatus, and a holding method for the plate for facilitating work to attach the plate to a plate-receiving metal frame of a sliding nozzle device. A gap is ensured between a to-be-held portion of the plate and an inner wall surface of an engagement groove such that, when the plate is held by engaging the to-be-held portion of the plate with the engagement groove of a holding portion of the plate-holding apparatus, the plate is movable in the longitudinal direction, the width direction, and the thickness direction of the plate.

10 Claims, 7 Drawing Sheets

(51) Int. Cl.
   *B22D 41/34* (2006.01)
   *B22D 41/38* (2006.01)
   *B22D 41/40* (2006.01)
   *B22D 41/56* (2006.01)

(58) Field of Classification Search
   USPC ............... 266/236, 275, 287; 164/437, 337; 222/591, 594, 600, 606, 599, 537, 536, 222/533, 526
   See application file for complete search history.

(56) References Cited

U.S. PATENT DOCUMENTS 8,783,528 B1 * 7/2014 Hicks .................... B22D 41/24
                                                    222/600
9,211,585 B2    12/2015 Funato et al.

FOREIGN PATENT DOCUMENTS

| JP | H07-132484 A | 5/1995 |
| JP | H07132484 * | 5/1995 ............. B22D 11/10 |
| JP | H08-39233 A | 2/1996 |
| JP | 9-206922 A | 8/1997 |
| WO | 2012/133181 A1 | 10/2012 |

OTHER PUBLICATIONS

Written Opinion for PCT/JP2017/037395, filed Oct. 16, 2017.
International Preliminary Report on Patentability dated Apr. 23, 2019 with Written Opinion (English translation) for PCT/JP2017/037395 filed, Oct. 16, 2017.

* cited by examiner

ID_PLATE, AND HOLDING APPARATUS AND HOLDING METHOD FOR THE PLATE

TECHNICAL FIELD

The present invention relates to a plate for use in a sliding nozzle device for flow rate control of molten metal, a plate-holding apparatus for holding the plate, and a holding method for the plate.

BACKGROUND ART

The sliding nozzle device comprises two or three plates each made of a refractory material and attached to a plate-receiving metal frame. When this plate is damaged and has expired a usable life thereof, it is necessary to open the sliding nozzle device, extract the old plate from each plate-receiving metal frame, and replace it with a new plate. This replacement operation must be performed under high temperatures, and the weight of the plate is about 30 kg for heavy plates, which is a heavy burden on an operator.

For this reason, a plate-holding apparatus for replacing the plate has been heretofore developed. For example, the following Patent Document 1 (JP H07-132484 A) discloses that a plate is grasped by a pair of claws of a parallel chuck. However, simply grasping the plate makes it difficult to accurately control the positioning of the plate with respect to the plate-receiving metal frame.

Further, the following Patent Document 2 (JP H08-39233 A) discloses a technique in which, when a cartridge of a cartridge type sliding valve device (SV device) is held by a hand and fitted and fixed at a predetermined position in the SV device body, a recess of a cartridge is engaged with a pin provided inside the SV device by means of a lock pin of the hand and a positioning fitting of the SV device body. However, in the case of only positioning with the hand and the SV device, when dimensional variations (e.g., length) occur during operation of producing the cartridge, the position of the recess of the cartridge deviates from the position of the pin provided inside the SV device. Thus, there is a problem of failing to engage the recess of the cartridge with the pin.

On the other hand, the following Patent Document 3 (WO 2012-133181 A) discloses a positioning mechanism between the plate and the plate-receiving metal frame. Specifically, there is disclosed a plate fixing structure, wherein:

the plate is provided with a first engagement portion extending outwardly from one of opposite ends thereof in a sliding direction thereof, and a second engagement portion extending outwardly from the other end; and the plate-receiving metal frame is provided with a first support portion for allowing the first engagement portion to be engaged therewith, and a second support portion for allowing the second engagement portion to be engaged therewith, and wherein the plate fixing structure is configured such that:

when the first engagement portion is engaged with and supported by the first support portion, the fitting convex or concave portion of the plate and the fitting concave or convex portion of the plate-receiving metal frame positionally conform to each other in the sliding direction of the plate; and, when the second engagement portion is subsequently engaged with the second support portion, the fitting convex or concave portion of the plate and the fitting concave or convex portion of the plate-receiving metal frame positionally conform to each other in a direction perpendicular to the sliding direction of the plate. However, in following Patent Document 3, work itself to attach the plate to the plate-receiving metal frame is a manual work, and thus there is a problem that a burden on the operator is heavy as described above.

CITATION LIST

Parent Document

Patent Document 1: JP H07-132484 A
Patent Document 2: JP H08-39233 A
Patent Document 3: WO 2012/133181 A

SUMMARY OF THE INVENTION

Technical Problem

A technical problem to be solved by the present invention is to provide a plate, a plate-holding apparatus, and a method of holding the plate for facilitating a work to attach the plate to a plate-receiving metal frame of a sliding nozzle device.

Solution to Technical Problem

According to an aspect of the present invention, there is provided a plate-holding apparatus in the following (1) to (6).

(1) A plate-holding apparatus for holding a plate such that the plate is movable along a guide so as to allow the plate to be attached to a plate-receiving metal frame of a sliding nozzle device while positioning the plate along the guide, comprising:

a plurality of holding portions having an engagement groove engageable with a to-be-held portion of the plate; and a widening and narrowing means to selectively widen and narrow a distance between the plurality of holding portions, wherein the plate holding apparatus is configured such that, when the plate is held in a state in which the to-be-held portion of the plate is engaged with the engagement groove, the engagement groove has a gap which allows the plate to be moved in a longitudinal direction, a width direction and a thickness direction of the plate.

(2) The plate-holding apparatus as described in (1), wherein the plurality of holding portions are arranged in opposed and parallel relation to each other, and the widening and narrowing means is configured such that the distance between the plurality of holding portions is selectively widened and narrowed while the parallel relation between the plurality of holding portions is maintained.

(3) The plate-holding apparatus as described in (1) or (2), which comprises a pressing portion for pressing the plate toward the plate-receiving metal frame.

(4) The plate-holding apparatus as described in any one of (1) to (3), wherein the number of the plurality of holding portions is two, and the engagement groove is provided in the two holding portions by a total number of four, wherein among the four engagement grooves, each of two pairs of two engagement grooves are provided, respectively, in opposite ends of each of the holding portions, and wherein the plate-holding apparatus further comprises a control means to control a minimum distance between the two holding portions.

(5) The plate-holding apparatus as described in (4), wherein the widening and narrowing means is configured to selectively widen and narrow the distance between the two holding portions in the longitudinal direction of the plate.

(6) The plate-holding apparatus as described in any one of (1) to (5), wherein the engagement groove comprises total four contactable portions consisting of an outer side in the width direction of the plate, an outer side in the longitudinal direction of the plate, and opposite sides in the thickness direction of the plate.

According to another aspect of the present invention, there is provided a plate in the following (7) to (10).

(7) A plate to be held by the plate-holding apparatus as described in any one of (1) to (6), comprising an engagement protrusion protruding from a side surface of the plate to serve as the to-be-held portion.

(8) The plate as described in (7), wherein the engagement protrusion is provided by a number of four, wherein the four engagement protrusions are arranged at respective positions symmetrically with respect to a longitudinal central axis of the plate.

(9) The plate as described in (7) or (8), wherein the engagement protrusion has a plate shape extending from a backplate of the plate.

(10) The plate as described in any one of (7) to (9), wherein the engagement protrusion has a corner portion orthogonal to the longitudinal central axis of the plate, on a side opposite to a nozzle hole of the plate.

According to further aspect of the present invention, there is provided a method of holding a plate in the following (11).

(11) A holding method for a plate to be held by a plate-holding apparatus such that the plate is movable along a guide so as to allow the plate to be attached to a plate-receiving metal frame of a sliding nozzle device while positioning the plate along the guide, the holding method comprising:
providing, in the plate-holding apparatus, a plurality of holding portions having an engagement groove for engaging with a to-be-held portion of the plate, and a widening and narrowing means for widening and narrowing a distance between the plurality of holding portions; and
ensuring a gap between the to-be-held portion of the plate and an inner wall surface of the engagement groove such that, when holding the plate by engaging the to-be-held portion of the plate with the engagement groove, the plate is movable in a longitudinal direction, a width direction, and a thickness direction of the plate.

Effect of the Invention

According to a plate-holding apparatus and a holding method for a plate of the present invention, gaps are ensured such that, when the plate is held by engaging the to-be-held portion of the plate with the engagement groove of a holding portion of the plate-holding apparatus, the to-be-held portion of the plate is movable in a longitudinal direction, a width direction, and a thickness direction of the plate, and thereby the plate can move in any direction within the range of the gap. Therefore, even if there are dimensional variations during operation of producing the plate, it is possible to accurately position the plate to a plate-receiving metal frame, and thus it is possible to facilitate a work to attach the plate to the plate-receiving metal frame. Further, the plate of the present invention can be suitably used for the plate-holding apparatus of the present invention, and thus it is possible to facilitate a work to attach the plate to the plate-receiving metal frame.

DESCRIPTION OF EMBODIMENTS

The present invention will be described below, based on embodiments.

First Embodiment

Figure 1:
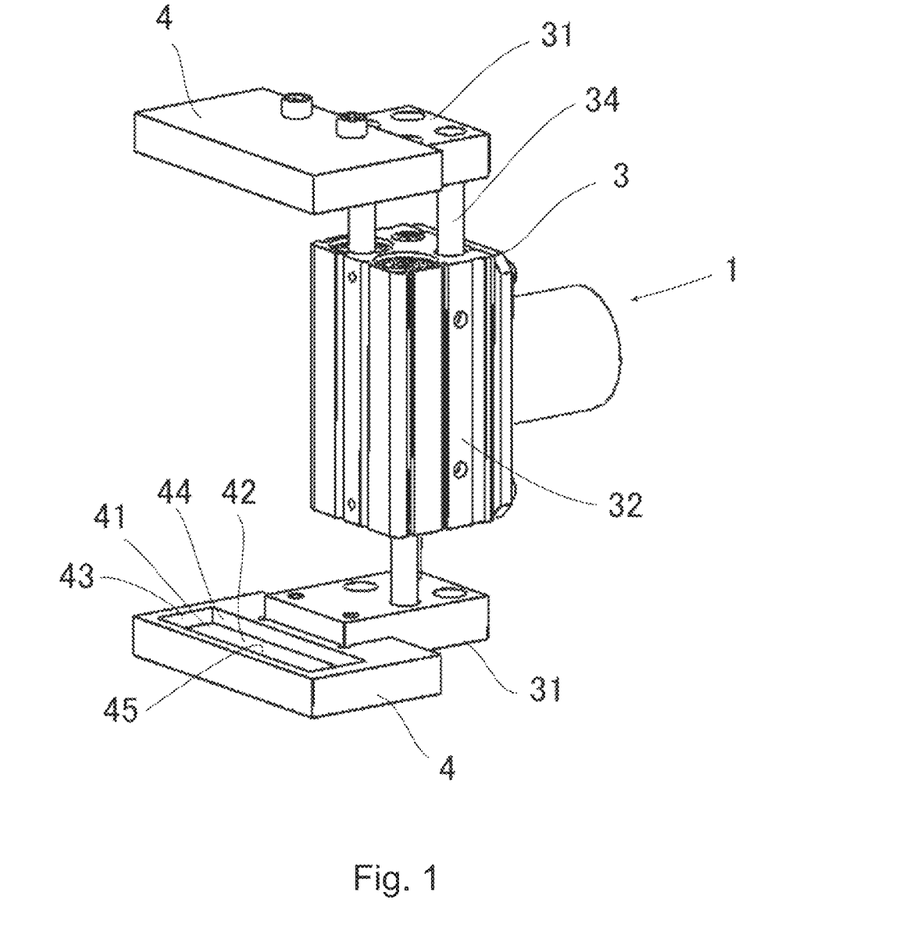
FIG. 1 is a perspective view depicting a plate-holding apparatus according to a first embodiment of the present invention.

FIG. 1 illustrates a plate-holding apparatus according to a first embodiment of the present invention. The plate-holding apparatus 1 comprises a parallel hand 3 serving as a widening and narrowing means, and a pair of (two) holding portions 4 each attached to a respective one of a pair of (two) parallel claws 31 of the parallel hand 3. This parallel hand 3 is configured such that a rod 34 is extended and retracted with respect to a body 32 thereof to widen and narrow a distance between the pair of parallel claws 31. Further, each of the holding portion 4 has an engagement groove 41 at a distal end portion thereof. The pair of holding portions 4 are arranged in opposed and parallel relation to each other, and can be synchronously moved by the parallel hand 3 such that they come close to and away from each other. Specifically, the parallel hand 3 is configured such that the distance between the pair of holding portions 4 is widened and narrowed while the parallel relation between the pair of holding portions 4 is maintained. Note that the widening and narrowing means is not limited to the parallel hand, but a parallel chuck may be used, for example. Further, the widening and narrowing means may be comprised of an oil-hydraulic cylinder, an air cylinder, or the like.

Figure 2:
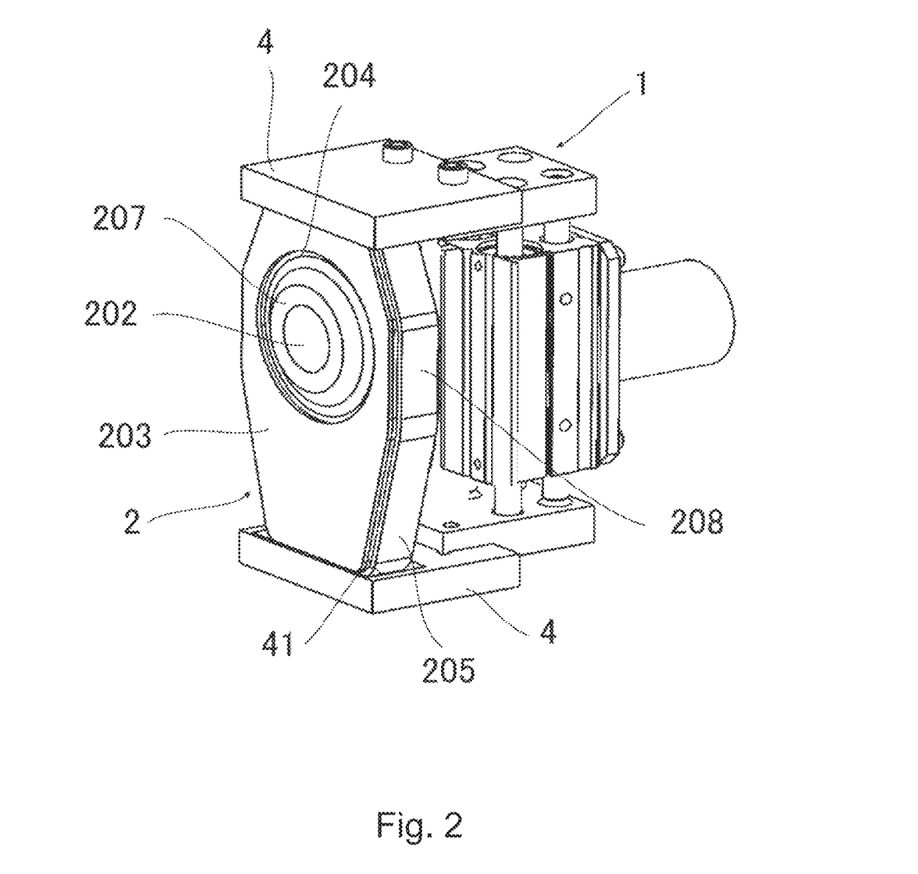
FIG. 2 is a perspective view depicting a state in which the plate is held by the plate-holding apparatus of FIG. 1.
Figure 3:
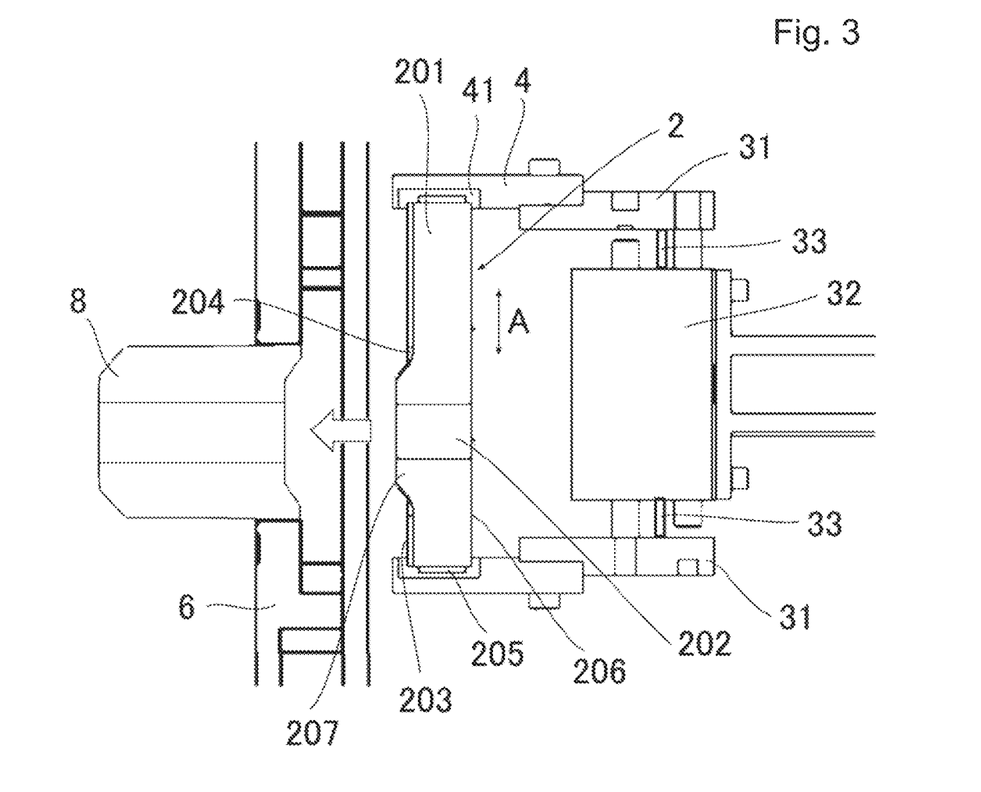
FIG. 3 is a vertical cross-sectional view depicting a state in which the plate held by the plate-holding apparatus of FIG. 1 is attached to a plate-receiving metal frame of a sliding nozzle device.

FIG. 2 depicts a state in which the plate is held by the plate-holding apparatus of FIG. 1, and FIG. 3 depicts a state when the plate held by the plate-holding apparatus of FIG. 1 is attached to a plate-holding device of a sliding nozzle device. The plate 2 to be held by the plate-holding apparatus 1 comprises: a refractory plate member 201 having a nozzle hole 202 for allowing molten steel to pass therethrough; a backplate 203 made of a metal (thin plate member made of iron) having an opening 204 provided on the back of the refractory plate member 201; and a metal band 205 provided on a side surface of the refractory plate member 201. A raised portion 207 of the refractory plate member protrudes into the opening 204 of the backplate 203. The raised portion 207 has a truncated conical shape whose side surface is inclined. A surface of the refractory plate member 201 on a side opposite to the backplate 203 is formed as a sliding surface 206 to be brought into sliding contact with a sliding surface of another plate so as to control the flow rate of molten steel. Here, the plate 2 will be attached to a plate-receiving metal frame 6 such that another plate can be brought into contact therewith in a manner slidably in the directions indicated by the arrowed line A in FIG. 3.

The plate 2 is held by the plate-holding apparatus 1 in a state in which longitudinal (sliding-directional) opposite ends thereof are engaged, respectively, with the engagement grooves 41 of the holding portions 4 of the plate-holding apparatus 1. That is, in this embodiment, a plurality of corners of each of the longitudinal opposite ends of the plate 2 serve as a to-be-held portion. Further, an inner wall surfaces of each of the engagement grooves 41 serves as a plurality of contactable portions. Specifically, four corners of each of the opposite ends of the plate are contactable held by the inner wall surface of a corresponding one of the engagement grooves 41, wherein the inner the wall surface serves as four contactable portions. Here, the four contactable portions consist of a longitudinal-directional contactable portion 42, a width-directional contactable portion 43, and two thickness-directional contactable portions 44, 45. The movement of the plate in each of the directions is restricted by these four contactable portions. The width-directional contactable portion 43 is a surface inclined at the same angle as that of a side surface of one of the corners serving as the to-be-held portion of the plate.

As shown in FIGS. 2 and 3, between the to-be-held portion of the plate 2 and each of the contactable portions (inner wall surface) in the engagement groove 41, a gap of 5 mm on each side is set in a longitudinal direction, a width direction and a thickness direction, respectively, of the plate 2. This allows the plate 2 to move in any direction (the longitudinal direction, the width direction and the thickness direction of the plate) within the range of the gap, and the plate-holding apparatus 1 has a so-called copying mechanism.

Here, in this embodiment, in FIG. 3, the setting of the gap in the longitudinal direction of the plate 2 is performed by rotating the gap adjusting bolt 33 provided in the body portion 32 of the parallel hand to adjust the length of the bolt. Specifically, when the holding portions 4 are moved in a direction along which the holding portions 4 come close to each other, the movement of the holding portions can be stopped by the gap adjusting bolt 33 coming in to contact with the parallel claw 31. That is, a protruding length of this gap adjustment bolt 33 can be adjusted by rotation. Therefore, the bolt 33 serves as a control means for controlling the minimum distance between the two holding portions. Note that in FIGS. 1 and 2, the gap adjusting bolt 33 is omitted.

FIG. 3 is an explanatory diagram for explaining the state of the gap. However, when the plate is actually held by the plate-holding apparatus as shown in FIG. 3, the to-be-held portion (the lower end portion in the sliding direction) comes into contact with the inner wall surface (bottom surface) of the engagement groove 41. Thus, in the present invention, the gaps may be secured such that the to-be-held portion of the plate is movable in the longitudinal direction, the width direction, and the thickness direction of the plate, respectively. In the case of this embodiment, as described above, a gap of 5 mm on one side is set, and thus it is possible to move within the range of 10 mm in the longitudinal direction, the width direction and the thickness direction of the plate, respectively. In other words, in this embodiment, the size of the gap is 10 mm in the longitudinal direction, the width direction and the thickness direction of the plate, respectively. In the present invention, the size of this gap is preferably in the range of 2 mm to 20 mm.

With the plate-holding apparatus 1 having the above structure, it is possible to easily attach the plate 2 to the plate-receiving metal frame 6. Specifically, as shown in FIG. 3, an upper nozzle 8 is attached to the plate-receiving metal frame 6. Therefore, when the plate 2 is attached to the plate-receiving metal frame 6, the center of an opening of the upper nozzle 8 must be aligned with a center of the nozzle hole of the plate. Here, the opening of the upper nozzle 8 has an inclined surface whose inner diameter expands toward the plate side, so that this inclined surface serves as a first guide to enable positioning of the plate. Further, in the width direction, the side walls on both sides in the width direction of the plate-receiving metal frame 6 have inclined surfaces serving as second guides, so that width-directional parallel side surfaces 208 (see FIG. 2) of the plate are positioned along the inclined surfaces. At this time, the plate 2 is held by the holding portion 4 with a gap as described above. Thus, even if the center of the opening of the upper nozzle 8 and the center of the nozzle hole of the plate or the side wall of the plate-receiving metal frame 6 and the width-directional parallel side surface 208 of the plate are misaligned, the to-be-held portion of the plate 2 is movable within the engagement groove 41 of the holding portion 4, so that the plate 2 is corrected in position and positioned at a correct position in the opening portion of the upper nozzle 8 and the plate-receiving metal frame 6. Once the plate 2 is attached to the plate-receiving metal frame 6, the plate does not drop off in a state in which it comes into contact with the magnet of the plate-receiving metal frame 6. And thus, the plate-holding apparatus 1 can be removed and the four side surfaces of the plate 2 can be held in the plate-receiving metal frame 6 by a conventional fixing technique.

By mounting and operating the plate-holding apparatus 1 on a balancer or an articulated robot, it is possible for an operator to attach the plate to the plate-receiving metal frame of the sliding nozzle device without grasping the plate. In addition, the parallel hand is commercially available, and thus it can be obtained at low cost and the plate-holding apparatus can be produced at low cost.

Second Embodiment

Figure 4:
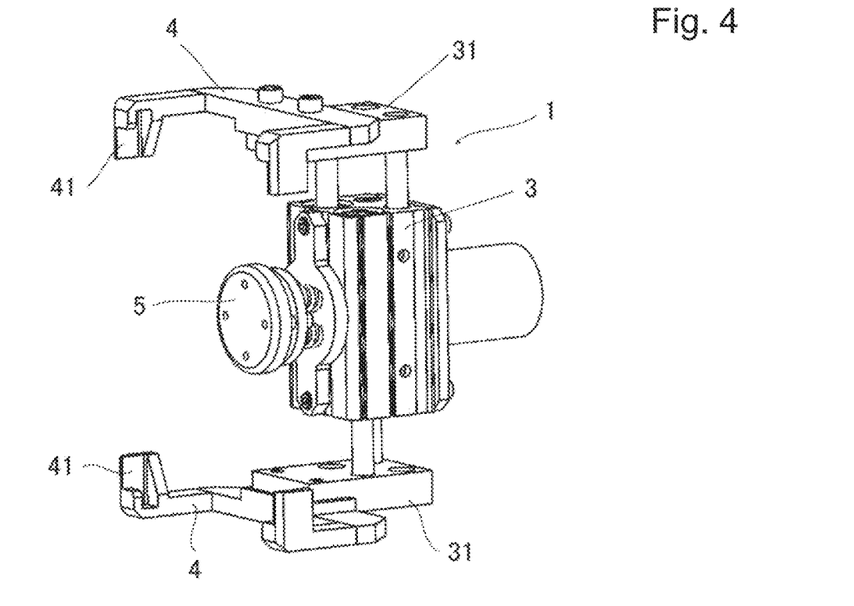
FIG. 4 is a perspective view depicting a plate-holding apparatus according to a second embodiment of the present invention.

FIG. 4 illustrates a plate-holding apparatus according to a second embodiment of the present invention. In addition to a parallel hand 3 as widening and narrowing means and a pair of (two) holding portions 4 attached to a pair of parallel claws 31 of the parallel hand 3, this plate-holding apparatus 1 comprises a pressing portion 5 provided on the body 32 on the holding portion 4 side between the parallel claws 31. Further, each of the holding portions 4 is substantially U-shaped in a plan view, and has two engagement grooves 41 at the distal end portions of opposite ends of each of the holding portions.

Figure 5:
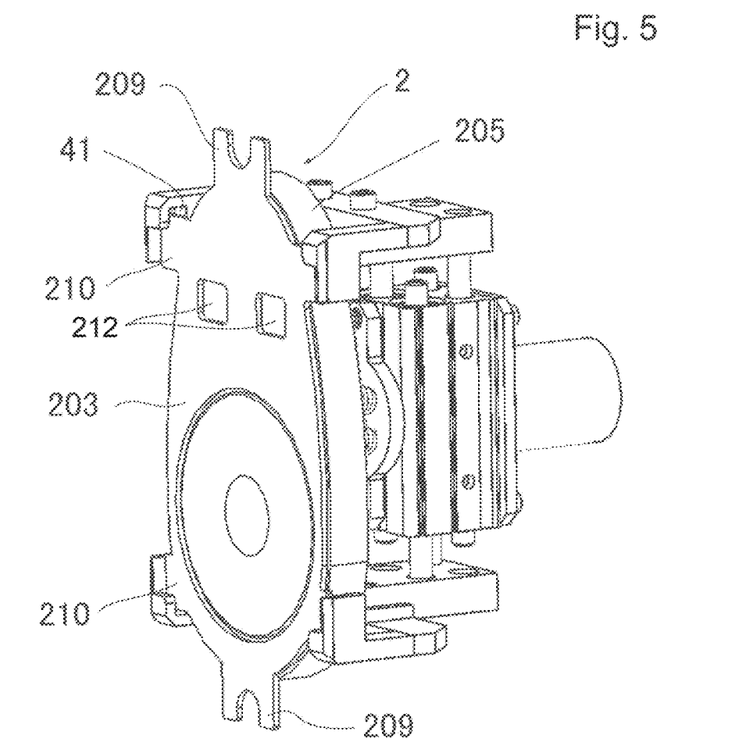
FIG. 5 is a perspective view depicting a state in which the plate is held by the plate-holding apparatus of FIG. 4.
Figure 6:
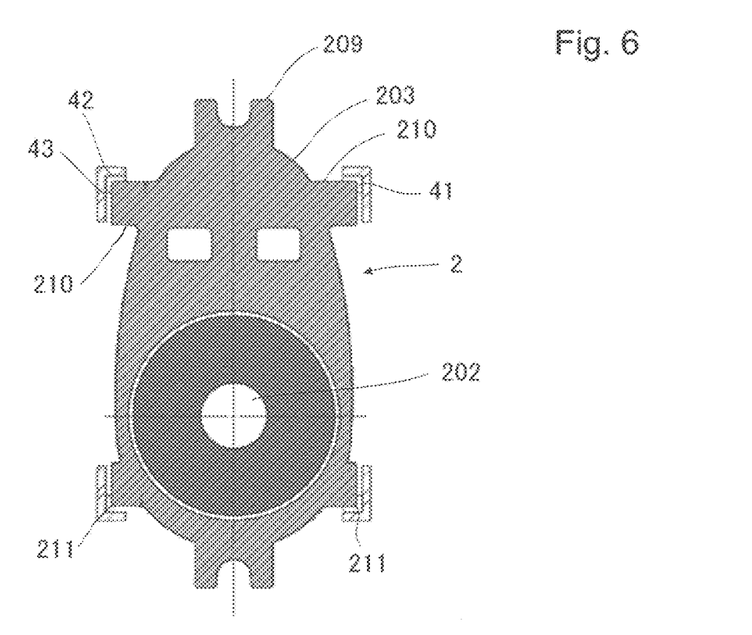
FIG. 6 is an explanatory diagram of gaps between a holding portion in the plate-holding apparatus of FIG. 4 and a to-be-held portion of the plate.

As shown in FIGS. 5 and 6, the plate 2 held by the plate-holding apparatus 1 is provided with a metal backplate 203 on the back side thereof, a side surface covered with the metal band 205 and plate-shaped fixing portions 209 extending in the longitudinal direction from the backplate 203. These features are the same as the plate disclosed in Patent Document 3. Furthermore, in this embodiment, a plate-shaped engagement protrusion 210 serving as a to-be-held portion of the plate is provided by a total number of four, which is extending laterally from the backplate 203 of the plate in a direction perpendicular to the longitudinal central axis of the plate in a plane including the backplate 203, wherein among the four plate-shaped engagement protrusion 210, each of two pairs of two plate-shaped engagement protrusion 210 are provided in each side of the backplate 203. Specifically, the engagement protrusions 210 are provided at four positions symmetrically with respect to a longitudinal central axis of the plate. Further, as shown in FIG. 6, each of the engagement protrusion 210 has a right angle corner portion 211 on the side opposite to the nozzle hole 202. The backplate 203, the fixing portions 209, and the engagement protrusion 210 of this embodiment were produced by processing a single iron plate having a thickness of 4 mm.

Figure 7:
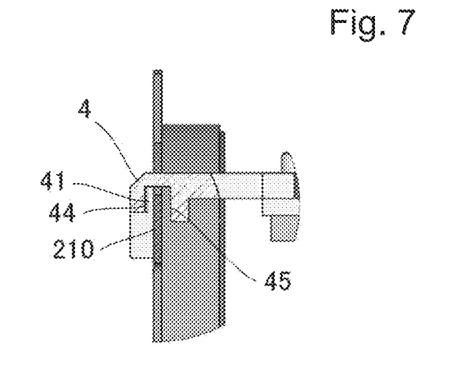
FIG. 7 is a partial enlarged sectional view of the holding portion in the plate-holding apparatus of FIG. 4.

Also, the engagement groove 41 of the holding portion 4 has total four contactable portions consisting of an outer side in the width direction of the plate 2, an outer side in the longitudinal direction of the plate 2, and opposite sides in the thickness direction of the plate. Specifically, as shown in FIGS. 6 and 7, four contactable portions consist of a longitudinal-directional contactable portion 42, a width-directional contactable portion 43, and a thickness-directional contactable portion 44, 45. Further, these contactable portions are provided as four inner wall surfaces opposed to the surfaces of the engagement protrusions 210, respectively. These four inner wall surfaces can cover the two side surfaces, the upper surface, and the lower surface of the corner portions 211 of the engagement protrusions 210.

As in the first embodiment, the pair of holding portions 4 come close to and separate from each other in the longitudinal direction (sliding direction) of the plate 2 by the operation of the parallel hand 3. However, when holding the plate 2, as shown in FIGS. 6 and 7, gaps are secured between the engagement protrusion 210 and the contactable portions serving as the inner wall surfaces of the engagement groove 41. Specifically, gaps between the longitudinal-directional contactable portion 42 of the engagement groove 41 and the engagement protrusion 210 (gaps in the longitudinal direction of the plate), gaps between the width-directional contactable portion 43 of the engagement groove 41 and the engagement protrusion 210 (gaps in the width-direction of the plate), and gaps between the thickness-directional contactable portions 44, 45 of the engagement groove 41 and the engagement protrusion 210 (gaps in the thickness direction of the plate) are provided, and the gaps are set to 5 mm on each aside.

By providing such a gap, the plate 2 is movable in any direction (the longitudinal direction, the width direction and the thickness direction of the plate) within the range of the gap. Therefore, even if there are dimensional variations during operation of producing the plate, it is possible to accurately position the plate to the plate-receiving metal frame.

Figure 8:
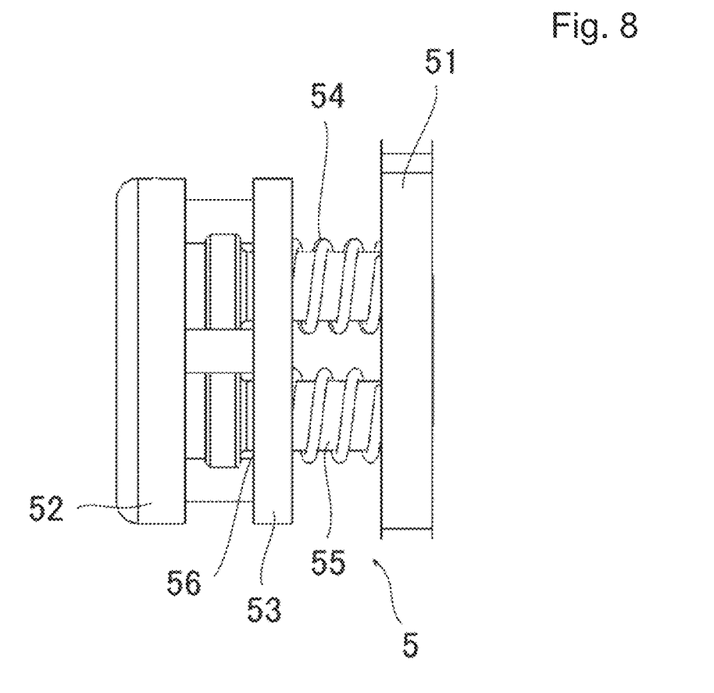
FIG. 8 is an enlarged side view of a pressing portion in the plate-holding apparatus of FIG. 4.

Next, a pressing portion 5 will be described. As shown in FIG. 8, four bolts 55 penetrate the four through-holes 56 of the holding plate 53 and the four coil springs 54, respectively, and are fixed to the base plate 51. The base plate 51 is attached to the body 32 of the parallel hand 3. A presser plate 52 is fixed to a holding plate 53 with a gap, and the presser plate 52 and the holding plate 53 are integrated. Then, the presser plate 52 moves to the base plate 51 side to allow the coil spring 54 to be deflected. At this time, by providing a gap between the through-hole 56 of the holding plate 53 and the bolt 55, the presser plate 52 can move even in a tilted state. The position of the presser plate 52 is set to a position where the coil spring 54 deflects when the plate is held by the holding portion 4 (the engagement groove 41). As a result, the plate becomes pressed against the inner wall surface of the engagement groove 41 on the plate-receiving metal frame side.

Figure 9:
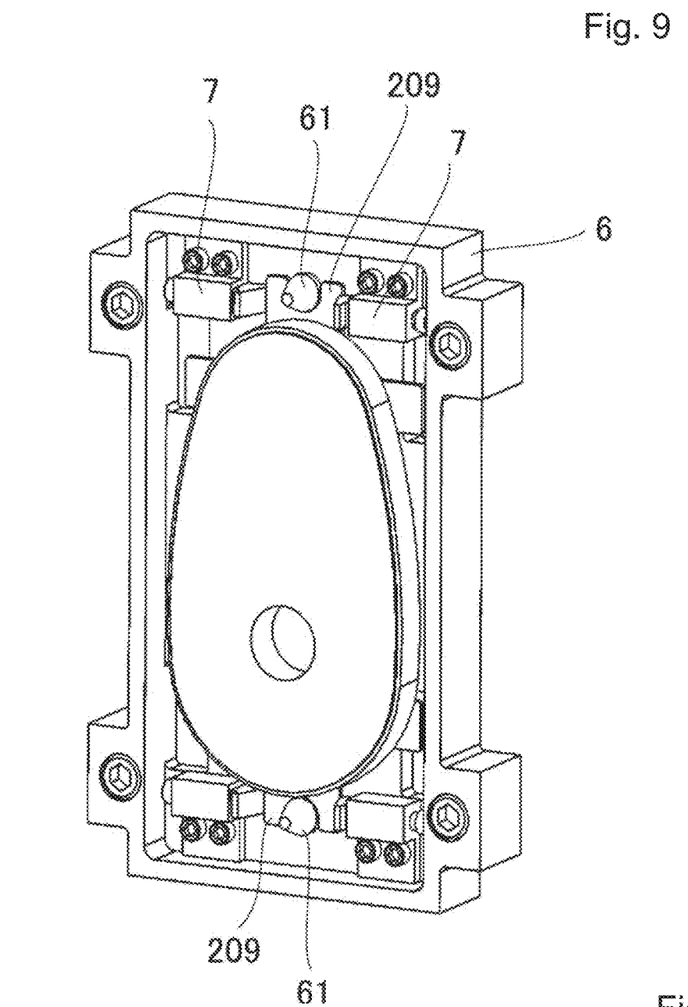
FIG. 9 is a perspective view depicting a state in which a plate used in a second embodiment of the present invention is attached to the plate-receiving metal frame.

FIG. 9 depicts a state in which a plate is attached to the plate-receiving metal frame in this embodiment. The plate-receiving metal frame 6 has two guide protrusions 61 for guiding the two fixing portions 209 of the plate and a fitting convex portion (not shown) for fitting the fitting concave portion 211 of the plate (see FIG. 5). These features are the same as the plate disclosed in Patent Document 3. Note that the guide protrusions 61 of the plate-receiving metal frame 6 have a cylindrical shape on the proximal end side and a truncated conical shape on the distal end side.

Next, in this embodiment, procedure for attaching the plate to the plate-receiving metal frame will be described in the case where the plate-holding apparatus is held by the balancer. The plate 2 is placed with the sliding surface facing upward and is held by the plate-holding device 1 which is also held by the balancer. At this time, the plate is lightly pressed against the thickness-directional contactable portion 44 by the pressing portion 5, and thus the plate 2 can be held in a state in which a gap is secured between an outer side of the engagement protrusion 210 in a longitudinal direction of the plate and an outer side in a width direction of the plate. Next, the plate-holding apparatus 1 is moved toward the plate-receiving metal frame, and while visually fitting mouths 209a of the fixing portions 209 of the plate 2 into the guide protrusions 61 of the plate-receiving metal frame 6, the plate 2 is moved toward the plate-receiving metal frame side in a direction perpendicular to the plate-receiving metal frame 6. Initially, the mouths 209a of the fixing portions 209 at both ends of the plate 2 are guided by the inclined surfaces of the truncated conical portion in the two guide protrusions 61 of the plate-receiving metal frame 6. At this time, the plate 2 held by the plate-holding device 1 can move in any direction within the range of the gap as described above, and thus it moves along the inclined surfaces of the guide protrusions 61. Further, at this time, the plate 2 is pressed and held toward the plate-receiving metal frame by an appropriate pressing force by the pressing portion 5. As a result, while preventing the excessive force from acting on the plate 2, the plate 2 can move smoothly while being guided by the guide protrusions 61 in the width direction and the longitudinal direction. Further, when the plate-holding apparatus 1 is moved toward the plate-receiving metal frame, the mouths 209a of the fixing portions 209 of the plate 2 is fitted into cylindrical portions of the guide projections 61. When the fixing portions 209 of the plate 2 contact the bottom surface of the plate-receiving metal frame 6, highly accurate positioning is achieved. Specifically, the fitting convex portion of the plate-receiving metal frame 6 is fitted in the fitting concave portion 211 of the plate, so that the plate 2 can be surely attached to the plate-receiving metal frame 6 with high positional accuracy. As described above, also the plate-holding apparatus 1 of this embodiment has a copying mechanism in which the plate 2 can move in any direction within the range of the gap and correct its position.

Further, in this embodiment, the engagement protrusions 210 protruding from the side surface of the plate serves as the to-be-held portion of the plate. The engagement protrusion 210 serving as the held portion of the plate is not affected by dimensional variations during operation of producing the plate body (refractory plate), and thus it can be provided with high dimensional accuracy. In addition, although the holding portion 4 of the plate-holding apparatus 1 moves in the longitudinal direction of the plate, as shown in FIG. 9, the plate-receiving metal frame 6 originally has a space in the longitudinal direction of the plate. Thus, it is unnecessary to newly provide a space for the holding portion 4 to move and the plate-receiving metal frame 6 can be kept compact. Furthermore, in this embodiment, when inserting the plate 2 into the plate storage metal frame 6, the inclination of the plate 2 can be reduced, and the plate 2 can be smoothly inserted, because the four engagement protrusions 210 serving as the to-be-held portions of the plate are provided at respective positions symmetrically with respect to the longitudinal central axis of the plate. The engagement protrusion 210 has a plate shape extending from the backplate 203 of the plate. Thus, the engagement protrusions can be produced at the same time as producing of the backplate 203, so that it is possible to produce with high dimensional accuracy during producing and in a simple manner. Note that the backplate 203, the plate-shaped engagement protrusions 210, and the fixing portions 209 can be formed of an iron plate having a thickness of 1 to 7 mm.

In this embodiment, the engagement protrusion has a corner portion orthogonal to the longitudinal central axis of the plate on the side opposite to the nozzle hole of the plate, and the two holding portions 4 is designed to be widened and narrowed in the longitudinal direction of the plate. This makes it possible to maximize the overlapping area between the engagement protrusion 210 and the contactable portion with the minimum widening and narrowing stroke of the holding portion 4. As a result, it is possible to minimize the space in which the holding portion 4 moves within the plate-receiving metal frame, and to make the plate-receiving metal frame compact. Furthermore, even with the existing plate-receiving metal frame, it is possible to adopt the present invention without requiring significant modification.

Figure 10:
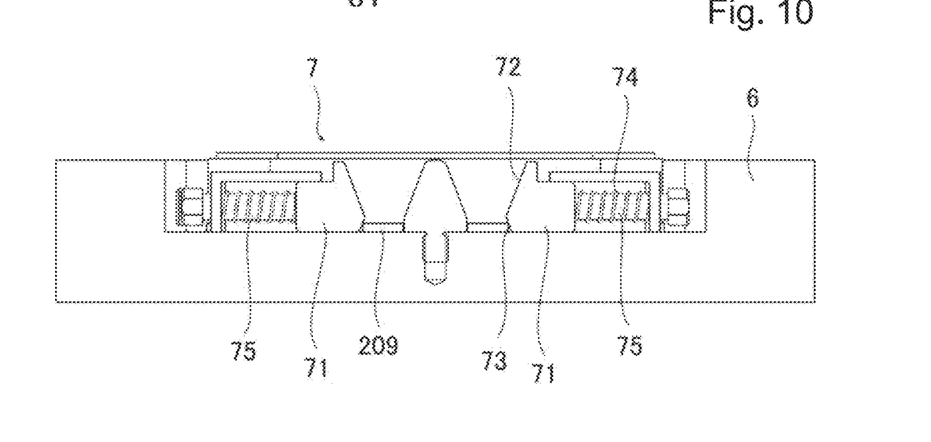
FIG. 10 is a sectional view depicting a state in which the plate used in a second embodiment of the present invention is attached to the plate-receiving metal frame.

Here, the plate 2 attached to the plate-receiving metal frame 6 is held by a lock mechanism 7 shown in FIGS. 9 and 10 so as not to drop off from the plate-receiving metal frame 6. Specifically, the locking mechanism 7 has a pair of holding blocks 71 at the distal end portions of a pair of bolts 75, and the holding block 71 has an inclined surface 72 inclined so as to open toward the sliding surface side of the plate, and an inclined surface 73 inclined so as to open toward the bottom surface side of the plate-receiving metal frame. The holding block 71 is held by a coil spring 74 so as to be movable in a direction parallel to the bottom surface of the plate-receiving metal frame and in a direction perpendicular to the longitudinal central axis.

When the plate is pressed against the plate-receiving metal frame 6, the fixing portions 209 are pressed against the plate-receiving metal frame 6 along the inclined surface 72, so that the pair of holding blocks 71 are opened and the fixing portions 209 are held and fixed between the pair of holding blocks 71. On the other hand, when detaching the plate from the plate-receiving metal frame 6, by moving the fixing portions 209 along the inclined surface 73, the pair of holding blocks 71 are opened and the plate can be detached.

In this embodiment, the engagement protrusion 210 is in the form of a plate, but other shapes such as a cylinder and a prism may be used.

Further, in the plate-holding apparatus 1 of this embodiment, the plate of the first embodiment can be held by adjusting the distance between the thickness-directional contactable portion 44 and the thickness-directional contactable portion 45 and the angle of the width-directional contactable portion 43. Furthermore, it is also possible to hold a conventional general plate. It is also possible to provide the contactable portion of the plate-holding apparatus as a hemispherical protrusion.

Third Embodiment

Figure 11:
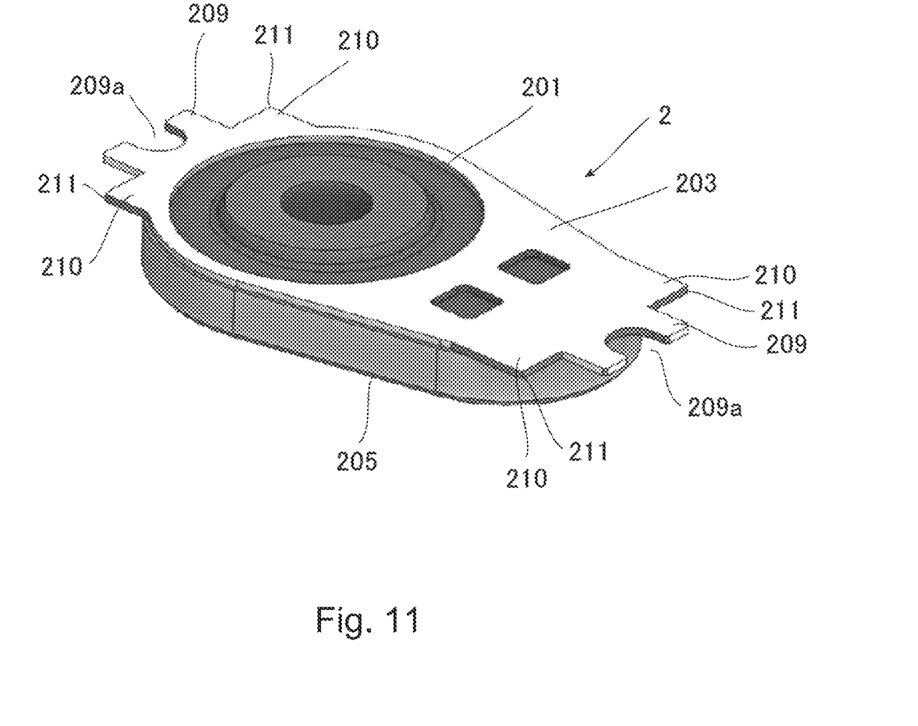
FIG. 11 is a perspective view of the plate used in a third embodiment of the present invention.

In a third embodiment, although the same plate-holding apparatus 1 as that of the second embodiment is used, the shape of the plate, specifically the position of the engagement protrusion 210 is different from that of the second embodiment. Specifically, in this embodiment, engagement protrusion 210 is provided in the longitudinal opposite ends of the backplate 203 by a total number of four, and among the four engagement protrusions, each of two pair of two engagement protrusions are provided, respectively, in opposite ends of each of the backplate 203. As in the second embodiment, the engagement protrusion 210 of the third embodiment also has plate-shape extending from the backplate 203 and is provided symmetrically with respect to the longitudinal central axis of the plate. The engagement protrusion 210 also has a corner portion orthogonal to the longitudinal central axis of the plate on the side opposite to a nozzle hole of the plate.

DESCRIPTION OF REFERENCE NUMERALS 1 plate-holding apparatus
2 plate
201 refractory plate member
202 nozzle hole
203 backplate
204 opening
205 metal band
206 sliding surface
207 raised portion
208 width-directional parallel side surface
209 fixing portion
209a mouth
201 engagement protrusion
211 corner portion
212 fitting concave portion
3 parallel hand (widening and narrowing means)
31 parallel claw
32 body
33 gap adjusting bolt
34 rod
4 holding portion
41 engagement groove
42 longitudinal-directional contactable portion
43 width-directional contactable portion
44 thickness-directional contactable portion
45 thickness-directional contactable portion
5 pressing portion
51 base plate
52 presser plate
53 holding plate
54 coil spring
55 bolt
56 through-hole
6 plate-receiving metal frame
61 guide protrusion 7 lock mechanism
71 holding block
72, 73 inclined surface
74 coil spring
75 bolt
8 upper nozzle

The invention claimed is:

1. A plate-holding apparatus for holding a plate such that the plate is movable along a guide so as to allow the plate to be attached to a plate-receiving metal frame of a sliding nozzle device while positioning the plate along the guide, comprising:
a plurality of holding portions each having an engagement groove engageable with a to-be-held portion of the plate; and
a widening and narrowing means to selectively widen and narrow a distance between the plurality of holding portions,
wherein the plate holding apparatus is configured such that, when the plate is held in a state in which the to-be-held portion of the plate is engaged with the respective engagement grooves, an inner wall surface of each of the engagement grooves serves as a contactable portion with the to-be-held portion of the plate, and each of the engagement grooves has a gap which allows the to-be-held portion of the plate to be moved in a longitudinal direction, a width direction and a thickness direction of the plate.

2. The plate-holding apparatus as recited in claim 1, wherein the plurality of holding portions are arranged in opposed and parallel relation to each other, and the widening and narrowing means is configured such that the distance between the plurality of holding portions is selectively widened and narrowed while the parallel relation between the plurality of holding portions is maintained.

3. The plate-holding apparatus as recited in claim 1, which comprises a pressing portion for pressing the plate toward the plate-receiving metal frame.

4. The plate-holding apparatus as recited in claim 1, wherein the number of the plurality of holding portions is two, and the engagement grooves are provided in the two holding portions by a total number of four, wherein among the four engagement grooves, each of two pairs of two engagement grooves are provided, respectively, in opposite ends of each of the holding portions, and wherein the plate-holding apparatus further comprises a control means to control a minimum distance between the two holding portions.

5. The plate-holding apparatus as recited in claim 4, wherein the widening and narrowing means is configured to selectively widen and narrow the distance between the two holding portions in the longitudinal direction of the plate.

6. The plate-holding apparatus as recited in claim 1, wherein the engagement grooves comprise total four contactable portions consisting of an outer side in the width direction of the plate, an outer side in the longitudinal direction of the plate, and opposite sides in the thickness direction of the plate.

7. A plate to be held by the plate-holding apparatus as recited in claim 1, comprising an engagement protrusion protruding from a side surface of the plate to serve as the to-be-held portion.

8. The plate as recited in claim 7, wherein the engagement protrusion is provided by a number of four, wherein the four engagement protrusions are arranged at respective positions symmetrically with respect to a longitudinal central axis of the plate.

9. The plate as recited in claim 7, wherein the engagement protrusion has a plate shape extending from a backplate of the plate.

10. The plate as recited in claim 7, wherein the engagement protrusion has a corner portion orthogonal to the longitudinal central axis of the plate, on a side opposite to a nozzle hole of the plate.

* * * * *